Patented Sept. 1, 1953

2,650,899

UNITED STATES PATENT OFFICE 2,650,899

STABILIZATION OF POLYMERIZABLE AROMATIC COMPOUNDS

Robert Nobbs Haward and Edward Teggin Borrows, Manchester, England, assignors to Petrocarbon Limited, London, England No Drawing. Application March 31, 1952, Serial No. 279,684. In Great Britain April 5, 1951

11 Claims. (Cl. 202—57)

This invention is concerned with the stabilisation of polymerisable, liquid, aromatic compounds having a $CH_2=C<$ group in the molecule.

The invention is particularly concerned with the stabilisation of the aromatic compounds referred to by incorporating therein an improved inhibitor for retarding polymerisation and is concerned both with stabilisation for storage purposes and with stabilisation during the course of manufacture, e. g. for the purpose of distillation.

The invention consists in the stabilisation of polymerisable, liquid, aromatic compounds having a $CH_2=C<$ group in the molecule by incorporating in the aromatic compound as an inhibitor against polymerisation a compound of the general formula:

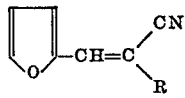

where R is CN or $COOC_nH_{2n+1}$, $n$ being not greater than 4.

The invention also consists in the distillation of a polymerisable, liquid, aromatic compound having a $CH_2=C<$ group in the molecule in the presence of a compound of the general formula given above as an inhibitor against polymerisation.

The invention also consists in a composition of matter comprising a polymerisable, liquid, aromatic compound having a $CH_2=C<$ group in the molecule and a compound of the general formula given above as an inhibitor against polymerisation.

Preferably the inhibitor used in the invention is 2-furfurylidene malononitrile i. e.,

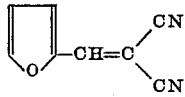

The invention may be applied with advantage to the stabilisation of styrene and single ring, substituted styrenes having a $CH_2=C<$ group in the molecule. It may also be applied to the stabilisation of heterocyclic aromatic compounds such as vinyl pyridine.

The new inhibitors used in the invention have been found to be of particular advantage in the distillation of styrene which is generally carried out under a reduced pressure. For this purpose the amount of inhibitor which is added to the styrene is dependent on the temperature of the still but is normally within the range of 0.001 to 0.5% by weight of the styrene. With a temperature of from 70 to 80° C. at the bottom of the still the amount of inhibitor used is preferably between 0.05 and 0.1% by weight of the styrene.

For storage purposes the incorporation of from 0.0001 to 0.01% by weight of inhibitor in the polymerisable aromatic compound will generally be found to be satisfactory.

The inhibitors used in the invention are superior to the known inhibitors in that they inhibit polymerisation more effectively when used in similar quantities. Furthermore, they are effective in the absence of oxygen and at the temperature normally used for the distillation of styrene. In addition, they do not become used up rapidly on polymerisation of the aromatic compound, nor do they decompose to give coloured products. The inhibitors used in the invention may be used in admixture with one another or with other inhibitors, e. g. with t-butyl catechol.

The behaviour of the inhibitors used in the invention is illustrated in the following examples.

Examples 1 and 2

In each case a test tube of styrene containing 50 parts per million by weight of the inhibitor was evacuated and sealed off and then heated at 80° C. for 24 hours. The following results were obtained.

| Example No. | Inhibitor | Degree of Polymerisation, Percent |
|---|---|---|
| 1 | 2 furfurylidene malononitrile | 1.9 |
| 2 | Ethyl furfurylidenecyanoacetate | 8.1 |

Similar experiments carried out with the known inhibitors hydroquinone, t-butyl catechol and sulphur all gave a degree of polymerisation in excess of 10%.

Example 3

A commercial concentrate of divinylbenzene, containing about 55 per cent by weight of divinylbenzene and freed by distillation of the inhibitor originally present, was heated at 80° C. in the absence of air and in the presence of 50 parts per million of newly added inhibitor. When t-butyl catechol was the added inhibitor the gelation time was 2¼ hours; with 2-furfurylidene malononitrile as the added inhibitor it was 6¼ hours. Thus 2-furfurylidene malononitrile was much more effective in delaying the gelation of the monomer mixture than t-butyl catechol.

We claim:
1. A process for stabilising a polymerisable, liquid, aromatic compound having a $CH_2=C<$ group in the molecule which comprises incorporating in the polymerisable compound as an inhibitor against polymerisation a compound of the general formula

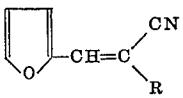

where R is selected from the group consisting of CN and $COOC_nH_{2n+1}$, $n$ being not greater than 4.

2. A process for the distillation of a polymerisable, liquid, aromatic compound containing a $CH_2=C<$ group in the molecule in which the polymerisable compound is distilled in the presence of an inhibitor against polymerisation of the general formula

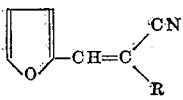

where R is selected from the group consisting of CN and $COOC_nH_{2n+1}$, $n$ being not greater than 4.

3. A composition of matter comprising a polymerisable, liquid, aromatic compound having a $CH_2=C<$ group in the molecule and as an inhibitor against polymerisation a compound of the general formula

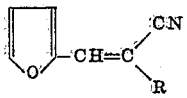

where R is selected from the group consting of CN and $COOC_nH_{2n+1}$, $n$ being not greater than 4.

4. A composition of matter as claimed in claim 3 in which the polymerisable compound is styrene.

5. A composition of matter as claimed in claim 4 in which the inhibitor amounts to from 0.0001% to 0.5% by weight of the polymerisable aromatic compound.

6. The process of claim 1 in which the polymerisable compound is styrene.

7. The process of claim 6 in which the inhibitor amounts to from 0.0001 to 0.5% by weight of the polymerisable compound.

8. The process of claim 2 in which the polymerisable compound is styrene.

9. The process of claim 8 in which the inhibitor amounts to from 0.001 to 0.5% by weight of the polymerisable compound.

10. A composition of matter as claimed in claim 3 in which the inhibitor is 2-furfurylidene malononitrile.

11. A composition of matter as claimed in claim 4 in which the inhibitor is 2-furfurylidene malononitrile.

ROBERT NOBBS HAWARD.
EDWARD TEGGIN BORROWS.

No references cited.